United States Patent

Horvath

[11] 4,039,453
[45] * Aug. 2, 1977

[54] AQUARIUM FILTER TANK PUMP WITH BYPASS

[75] Inventor: Tibor Horvath, Brooklyn, N.Y.

[73] Assignee: Aquology Corporation, Newark, N.J.

[*] Notice: The portion of the term of this patent subsequent to July 10, 1990, has been disclaimed.

[21] Appl. No.: 706,804

[22] Filed: July 19, 1976

[51] Int. Cl.² ............................................. E04H 3/16
[52] U.S. Cl. ................................... 210/169; 415/215; 417/424
[58] Field of Search .................. 210/169; 415/215; 417/424; 137/569, 151, 135

[56] References Cited

U.S. PATENT DOCUMENTS

| | | | |
|---|---|---|---|
| 2,563,862 | 8/1951 | Nechine | 137/569 |
| 2,927,596 | 3/1960 | Carlson | 137/151 X |
| 3,682,193 | 8/1972 | Newsteder | 137/151 |
| 3,744,635 | 7/1973 | Horvath | 210/169 |
| 3,771,544 | 11/1973 | Horvath | 210/169 |
| 3,822,715 | 7/1974 | Rao | 137/135 |

Primary Examiner—Theodore A. Granger
Attorney, Agent, or Firm—Peter L. Tailer

[57] ABSTRACT

An aquarium filter tank pump has a housing with a large upper portion and a small lower portion joined by a transition. A motor driven impeller generally conforming to the inside of the housing draws water into an inlet in the bottom of the lower portion of the housing and discharges it through a generally tangential outlet tube extending from the upper portion and containing an adjustable flow constriction control. A bypass tube extends downward from an opening in the transition so that restriction of flow through the discharge tube controlling pump output is balanced by flow through the bypass tube.

8 Claims, 3 Drawing Figures

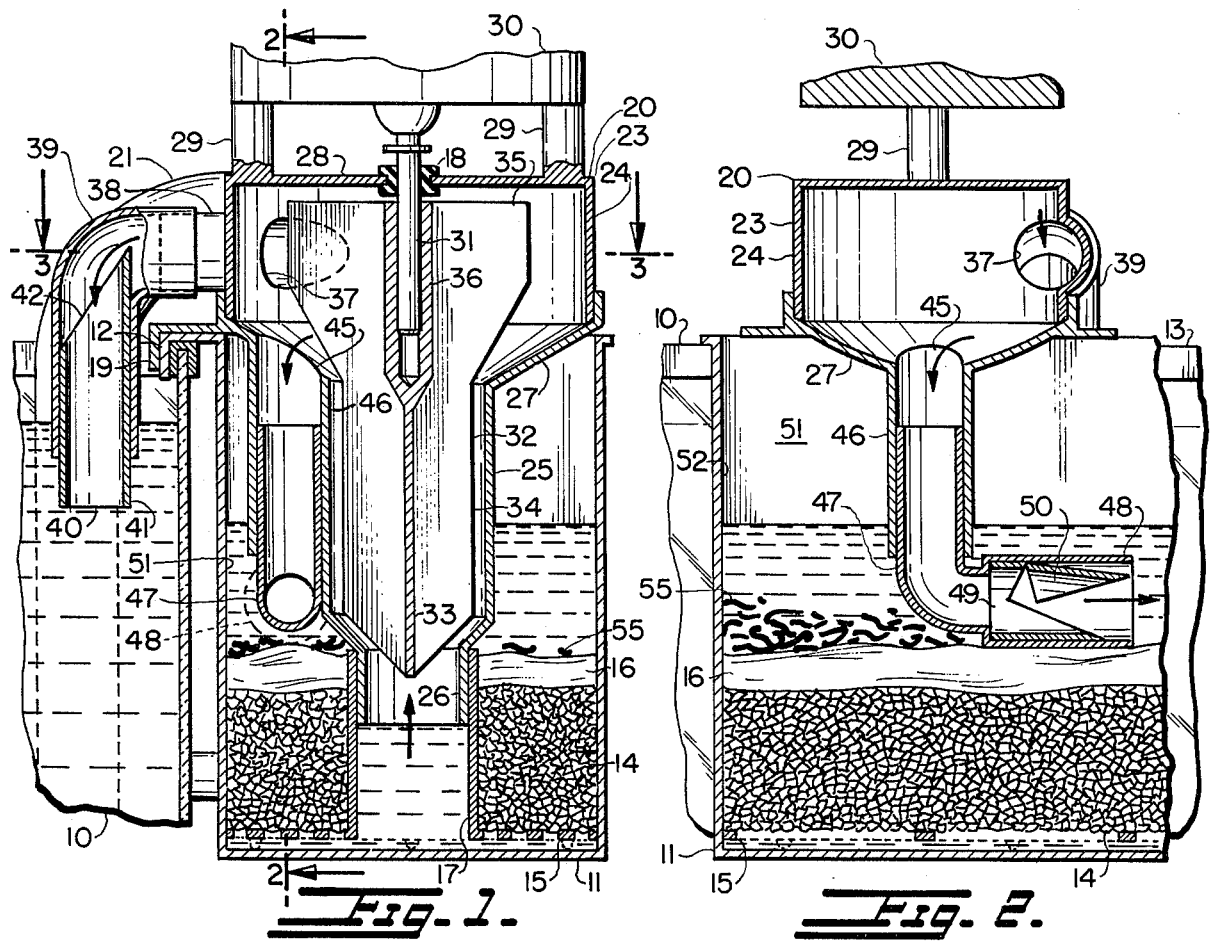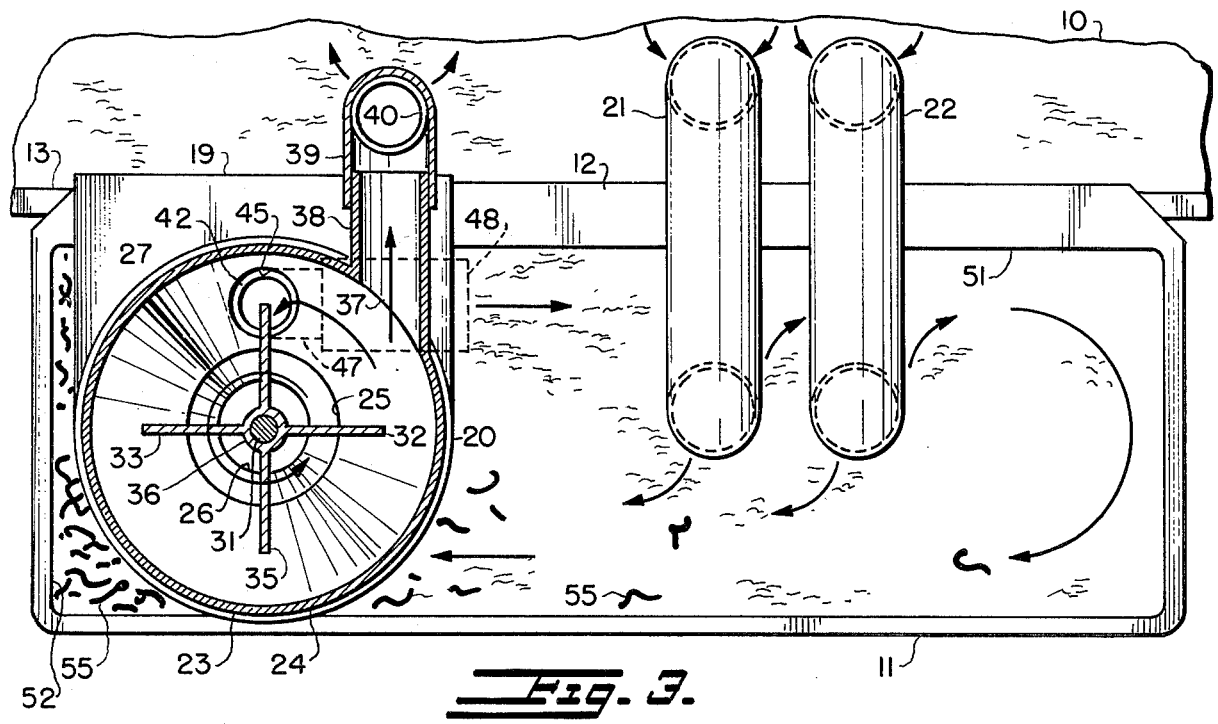

AQUARIUM FILTER TANK PUMP WITH BYPASS

BACKGROUND OF THE INVENTION

1. Field of the Invention

This invention relates to pumps, and, more particularly, to aquarium filter tank pumps and the like.

2. Description of the Prior Art

Aquarium filter tank pumps have heretofore been made in different sizes or of different powers to have a specific capacity to pump a desired number of liters per hour. The output of the pump of this invention can be adjusted downward to any desired level.

SUMMARY OF THE INVENTION

An aquarium filter tank pump has an impeller housing having a small lower portion, a large upper portion, and a flared intermediate transition portion between the upper and lower portions. The housing contains a motor driven impeller mounted on a motor shaft extending through the top wall of the housing. The impeller has a large upper portion in the upper portion of the housing and a small lower portion extending into the lower portion of the housing, the housing containing an inlet at the bottom of its lower portion and having a generally tangential outlet tube extending from an outlet opening in the side of the upper portion of the housing. The outlet tube has associated with it a flow restriction control device. A bypass tube extends downward from an aperture in the transition portion so that restricting and thereby controlling flow from the outlet tube causes flow through the bypass tube.

The construction of the pump of this invention allows output to be controlled by means of a flow restricting device associated with the outlet tube. This allows one size pump to be used on a wide range of sizes of aquarium tanks as any desired flow of filtered water can be provided up to the pump's maximum capacity. The purchaser of a small aquarium tank can now buy the pump of this invention and later use it on a larger tank if he upgrades his aquarium. He need no longer buy a new pump for each new larger tank. An additional main advantage provided by the pump of this invention is that all bypassed water is refiltered in the filter tank to increase the effectiveness of the filtration process at low outputs. In the filter tank, the bypass can be directed so that it concentrates large particle waste products at one location in the tank for better aesthetics and easier removal.

BRIEF DESCRIPTION OF THE DRAWING

Fig. 1 is a vertical section through a filter tank, a fragment of an associated aquarium tank, and an aquarium filter tank pump according to this invention, the pump motor being partially broken away;

FIG. 2 is a vertical section taken on line 2—2 of FIG. 1; and

FIG. 3 is a horizontal section taken on line 3—3 of FIG. 1.

DESCRIPTION OF THE PREFERRED EMBODIMENT

As is well known in the art and shown in FIGS. 1-3, an aquarium tank 10 has a filter tank 11 hung adjacent to it by the filter tank lip 12 which hook over the rim 13 of tank 10. Filter tank 1, which is rectangular in shape, contains a bed of filter material 14, usually a form of activated charcoal, disposed on top of a grid 15 and covered by glass wool 16. Grid 15 is spaced above the bottom of filter tank 11 and has a pump accommodating tubular boss 17 extending upward therefrom near one end. Boss 17 extends through bed 14 and the layer of cover material 16. A pump 20 draws filtered water from below grid 15 and passes it into tank 10 while siphons 21 and 22 return water from tank 10 to filter tank 11 for filtration.

The pump 20 has features which, in this enviornment, are the essence of this invention. A housing 23 of pump 20 has a large upper portion 24, a small lower portion 25 terminating in an inlet 26 which connects with the tubular boss 17, a conical transition portion 27 between the upper and lower portions 24 and 25, and a top wall 28. Top wall 28 has projections 29 to which a motor 30 is fixed to have its shaft 31 extend into housing 23 through seal 18. Transition 27 may have an extension formed to terminate in a lip 19 to position pump 20 at one end of filter tank 11.

Fixed on shaft 31 within housing 23 is an impeller 32 which generally conforms to the inside of housing 23 in that it has vanes 33 forming a smaller lower portion 34 and a larged upper portion 35. Vanes 33 are integrally formed with hub 36 which is forced on shaft 31 to be fixed thereon. An outlet aperture 37 in the large upper portion 24 communicates with the generally tangential outlet tube 38 on which there is fixed a downwardly turned 90° elbow 39. The foregoing elements of pump 20 are in accordance with the broadest teachings of my U.S. Pat. No. 3,744,635 issued July 10, 1973.

Extending into elbow 39 is flow control element 40 which is a tube 41 having an upper end 42 cut at about 45° with the axis of tube 41 so that the selective rotation and longitudinal positioning of tube 41 will adjust pump outlet flow from a substantially complete blockage to free maximum flow. Any other suitable selective or adjustable flow restricting valve means may be used in place of element 40.

A bypass aperture 45 in transition 27 communicates with the downward extending bypass tube 46 which extends downward adjacent to lower portion 25 of housing 23. A 90° elbow 47 is connected to bypass tube 46 and terminates in the check valve 48. Check valve 48 may be of any type, but it is shown as having a tubular seat 49 cut to receive the hinged flap element 50 shown in an open position in FIG. 2.

Bypass tube 46 is preferably located between portion 25 and side wall 51 of filter tank 11 adjacent to tank 10. Elbow 47 preferrably directs bypass flow along wall 51 to provide the specific result shown in FIGS. 1-3 in which a circuitous flow is set up by bypass tube 47 and elbow 47 in filter tank 11. In practice this flow, along with downward flow through the filter materials 14 and 16, causes gross larger particles 55 to accummulate behind pump 20 between it and end wall 52. This tends to render the particles 55 less visible and makes them easier to physically remove from tank 11 between changes of filter material 14 and 16.

Any desired pump outlet flow into tank 10 can be set using the flow control element 40. For small tanks 10 and in some other situations, a low flow is desirable so as not to disturb aquarium contents. At low outlet flow rates, a large proportion of the pump 20 output will be recirculated through bypass tube 46 to be filtered again before re-entering pump 20. Thus a large capacity pump 20 can be purchased for a small output requirement and adjusted to provide the desired output. At the same time the added advantage results in that all recirculated water is further filtered. As greater outlet flow of filtered water is required, element 40 can be set accordingly until there is free outlet flow and no recirculation. Bypass tube 46 best extends under the water level in filter tank 11 as under full outlet flow conditions a slight suction may be formed. If bypass tube 46 did not extend into the water, air might be drawn into housing 23 to pass as froth in the outlet stream with undesirable results.

If the filter material 14 and 16 becomes well plugged with filtered matter so as to restrict flow into inlet 26, unfiltered water may tend to be drawn into bypass tube 46 to be expelled through outlet tube 38 into tank 10. The check valve 48 prevents this. In some applications where the pump 20 is only to be used at full flow with no recirculation desired, it may be sold with a rubber stopper (not shown) to plug bypass tube 46. If desired, outflow from bypass tube 46 may be directed out of tank 11 to a gravity filter or the like. Outflow from bypass tube 46 can also be directed through a siphon starting venturi or like device (not shown).

In aquarium filter tank pumps 20, the seal 18 about the motor shaft 31 is the element most prone to failure and leakage. While the output of filtered water could be controlled in conventional pumps by restricting the outlet flow, this will cause a considerable pressure increase in the pump housing under some circumstances. If a seal 18 then leaks, a dangerous jet of water will strike motor 30 which could cause an electrical short circuit or other disastrous results.

While this invention has been shown and described in the best form known, it will nevertheless be understood that this is purely exemplary and that modifications may be made without departing from the spirit of the invention.

I claim:

1. A pump for an aquarium filter tank, said filter tank containing water and having filter material in said filter tank, means supporting said filter material, and a suction outlet drawing water from below said filter material, said pump comprising, in combination, a housing having a large upper portion containing a cylindrical cavity disposed at least partly above the top of said filter tank, a tangential outlet from said cylindrical cavity extending out over the top of said filter tank, a small lower portion with an inlet at the bottom thereof connected to said suction outlet, and a transition between said upper and lower portions, a motor mounted above said casing and having a shaft extending into said casing, an impeller in said housing mounted on said shaft, said impeller having a larger upper portion within said cylindrical cavity of said upper portion of said housing and a smaller lower portion extending downward within the lower portion of said housing below the level of water in said filter tank, said smaller lower portion of said impeller priming said upper portion of said housing by raising water into said cavity where efficient pumping action takes place, flow constricting control means associated with said outlet tube, said casing containing a bypass opening, and a bypass tube extending from said bypass opening into said filter tank above said filter material so that restriction of flow through said outlet tube by said control means causes flow from said bypass tube back into said filter tank.

2. The combinatin according to claim 1 wherein said bypass opening in said housing is in said transition.

3. The combination according to claim 2 wherein said bypass tube extends downward adjacent to said lower portion of said housing.

4. The combination according to claim 3 wherein said bypass tube extends below the water in said filter tank.

5. The combination according to claim 4 with the addition of a check valve connected to said bypass tube.

6. The combination according to claim 4 with the addition of an elbow at the end of said bypass tube directing flow therefrom horizontally.

7. The combination according to claim 6 wherein said filter tank is rectangular with two end walls and two side walls, said pump is adjacent to one of said end walls of said filter tank, and said elbow directs fluid away from said pump along one of said side walls of said filter tank.

8. The combination according to claim 7 wherein said bypass tube extends vertically downward between said lower portion of said housing and one of said side walls of said filter tank.

* * * * *